Aug. 2, 1960 W. E. CHOATE ET AL 2,947,145
MULTIPLE MASTER CYLINDER
Filed June 6, 1958 2 Sheets-Sheet 1

INVENTORS
WILLIAM E. CHOATE,
JOSEPH A. MORGAN,
BY

McMorrow, Berman & Davidson
ATTORNEYS.

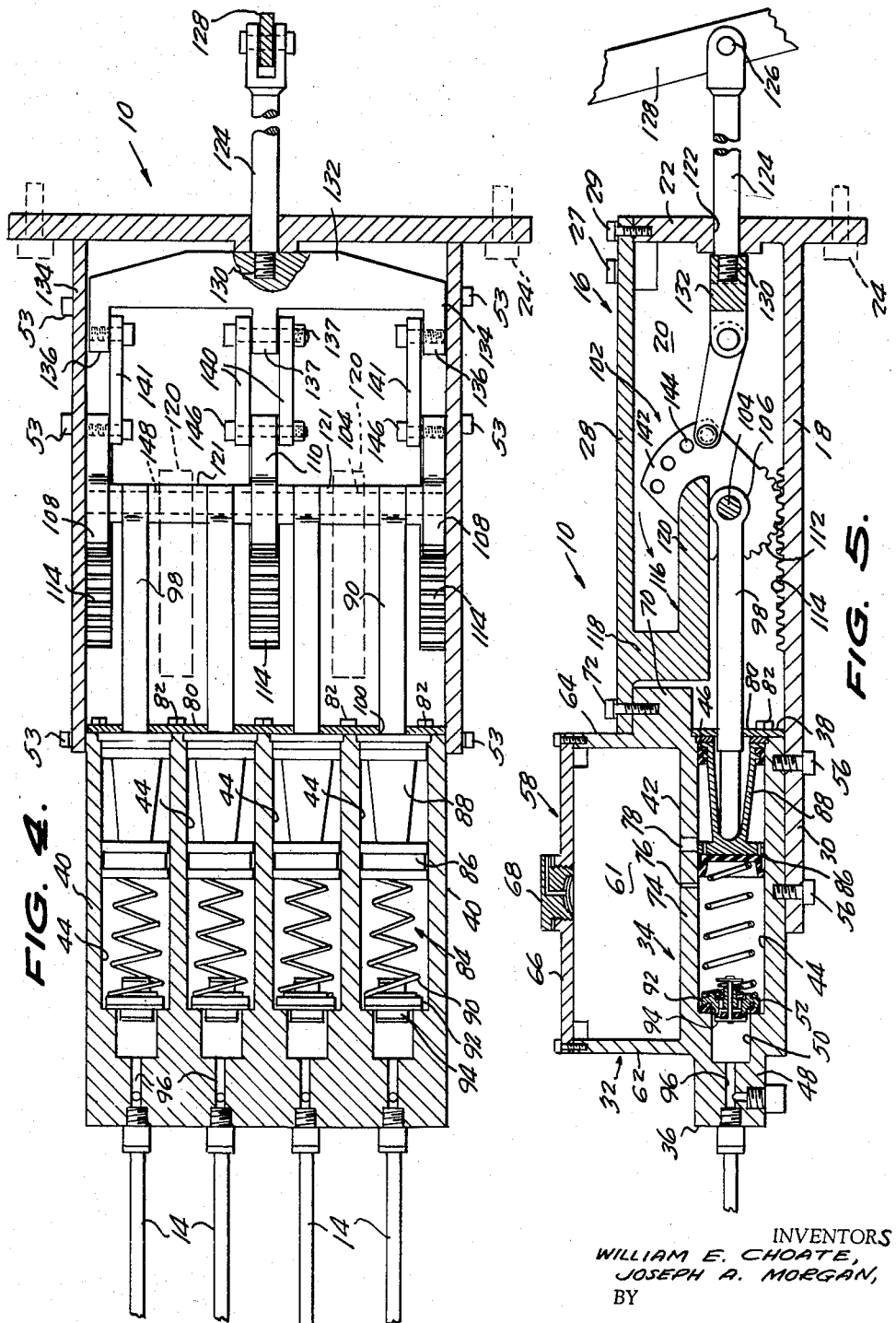

2,947,145
MULTIPLE MASTER CYLINDER

William E. Choate, P.O. Box 321, Galveston, Tex., and Joseph A. Morgan, Chalmette, La.

Filed June 6, 1958, Ser. No. 740,431

6 Claims. (Cl. 60—54.6)

This invention relates to an improved multiple master cylinder for producing individual pressures in separate components of a hydraulic system, such as the brakes of a hydraulic vehicle brake system.

The primary object of the invention is to provide a more efficient, reliable, and longer-lasting device of this kind which requires less force for its actuation, and practically eliminates the possibility of complete brake failure, in the case of incorporation of the device in a hydraulic automotive brake system.

Another object of the invention is to provide a device of the character indicated which is suitable for replacement of the conventional single brake master cylinders of hydraulic automotive brake systems by virtue of its being in a compact and adaptable form and having means for mounting it in place of a conventional master cylinder.

A further object of the invention is to provide a device of the character indicated above, for incorporation in automotive brake systems, whose individual cylinders are equipped with substantially conventional and readily replaceable and serviceable cylinder kits involving pistons, cups, springs, valves, and valve seats, and wherein failure of individual cylinders does not impair the functioning of remaining cylinders and the brakes connected thereto.

Other important objects and advantageous features of the invention will be apparent from the following description, and the accompanying drawings, wherein, for purposes of illustration only, a specific form of the invention is set forth in detail.

In the drawings:

Figure 4 is a horizontal section taken on the line 4—4 of Figure 3; and

Figure 5 is a vertical longitudinal section taken on the line 5—5 of Figure 2.

Figure 1:
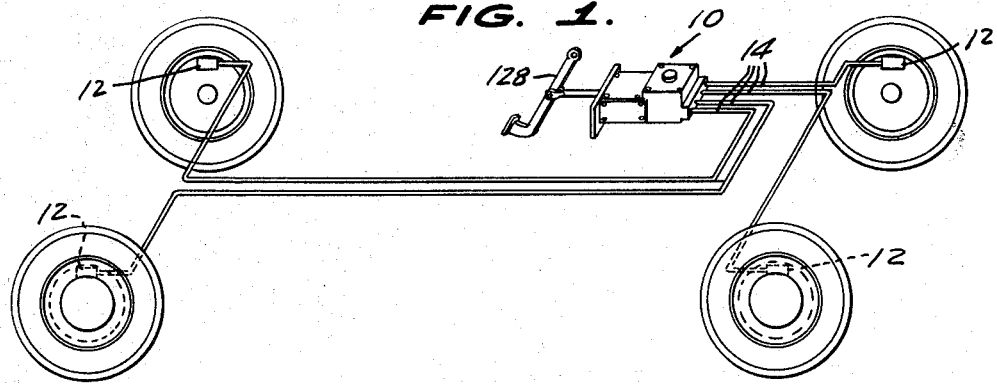
Figure 1 is a schematic view showing incorporation of a device of the invention in an automotive hydraulic brake system.
Figure 2:
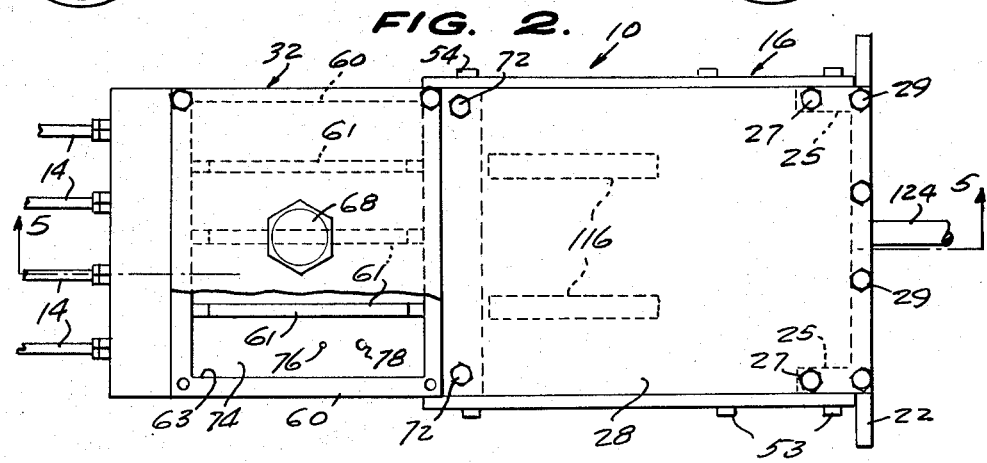
Figure 2 is a top plan view of the device per se.
Figure 3:
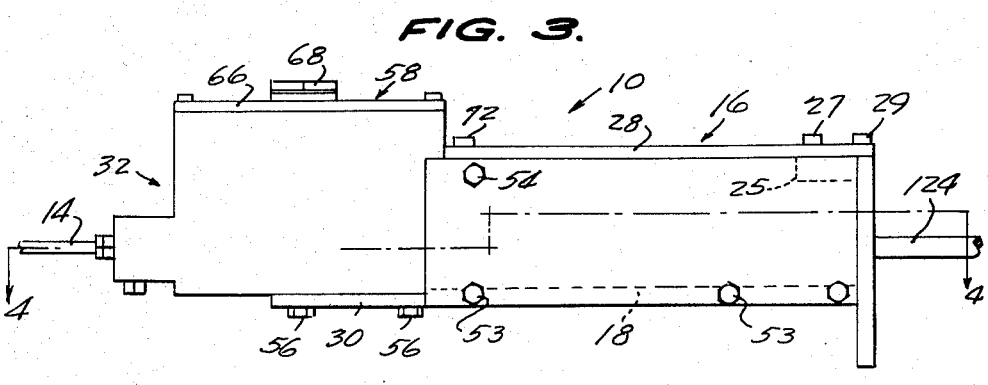
Figure 3 is a side elevational view of Figure 2.

Referring in detail to the drawings, wherein like reference numerals designate like parts throughout the several views, the illustrated multiple master cylinder, generally designated 10, is shown as incorporated in an automotive system having four wheel cylinders 12, each of which is effectively connected to the device 10 by an individual and single brake line 14.

The device 10 comprises a relatively flat, horizontally elongated mechanism casing 16 having a bottom wall 18, side walls 20, and a rear end wall 22. The rear end wall 22 is preferably integral with and extends below the bottom wall 18 and beyond the side walls 20, where it is traversed by studs 24 and serves as a bracket for mounting the device in place of a conventional master cylinder. The casing 16 is open at its forward end and at its top, and the open top is closed by a removable cover plate 28. As shown in Figure 5, the bottom wall 18 has a coplanar forward end portion 30 which reaches forwardly beyond the side wall 20 and the cover plate 28. The side walls 20 are preferably in the form of plates which are secured to the side edges of the bottom wall by means of studs 53. The cover plate 28 rests upon the upper edge of the end wall 22, and is secured thereto by studs 29, and upon blocks 25 projecting inwardly from the wall 22, and is secured thereto by studs 27.

The device 10 further comprises a preferably rectangular cylinder housing 32 which can be shorter than the mechanism casing 16 and is slightly narrower, and slightly taller than the casing 16. The cylinder housing 32 comprises a flat, low-profile cylinder block 34 having a forward end 36, a rear end 38, sides 40, and a top 42. A suitable number, here shown as four, of cylinder bores 44 and formed in the block 34 and have open rear ends 46 opening through the rear end 38 of the block, and closed forward ends 48 which are the closed ends of reduced diameter forward bore portions 50, which define shoulders 52 in the bores 44.

The rear end 38 of the block 34 engages part way into the open forward end of the casing 16 and rests upon the extension 30 of the bottom wall 18 of the casing 16. Side studs 54 traverse the casing side walls 20, and bottom studs 56 traverse the extension 30 and secure the block 34 on the casing 16.

Preferably integral with the top 42 of the block 34 and upstanding thereon is a hydraulic reservoir 58 having side walls 60, front and rear end walls 62 and 64, respectively, and an open top closed by a removable cover plate 66 provided with a filling opening closed by a removable plug 68. On and projecting rearwardly from the rear end wall 64 is a bracket 70 which underlies the cover plate of the casing 66 and is secured thereto, as by studs 72. The interior of the reservoir 58 is divided by interior longitudinal partition walls 61 into individual reservoir compartments 63 for individual cylinder bores 44.

The top 42 of the block 34 defines side walls 74 for the cylinder bores 44, and these side walls 74 are traversed by longitudinally spaced inlet and outlet ports 76 and 78 which provide communication, at times, between the reservoir 58 and individual cylinder bores 44.

Closure plates 80, secured to the rear end 38 of the block 34 by studs 82, hold in place in the cylinder bores 44, individual cylinder kits, generally designated 84, which include pistons 86, cups 88, springs 90, valves 92, and valve seats 94. As shown in Figure 5, the seats 94 bear against the cylinder shoulders 52, and are in communication with related individual brake lines 14 through axial passages 96, extending through the forward ends of the cylinder bores, with which the brake lines 14 are connected. The pistons 86 are positioned relative to the ports 76 and 78 so as to force hydraulic fluid under pressure to the brake lines 14 upon forward movement of the pistons 86, and to relieve pressure in the brake lines upon rearward movement of the pistons produced by the springs 90. The pistons have thereon piston rods 98 which extend rearwardly through openings 100 in the closure plates 80.

The casing 16 contains piston actuating mechanism, generally designated 102, which comprises an unjournaled transverse shaft 104, occupying a position substantially midway between the ends of the casing 16 and extending to its side walls 20, and on which the piston rods 98 are journaled at their rear ends, as indicated at 106. Also journaled on the shaft 104 and bearing against the side walls 20, are outer sector or cam gears 108, and a similar middle sector or cam gear 110 is journaled on the shaft 104 at the middle thereof. Each of the sector gears has a toothed quadrant 112 which is in mesh with longitudinal rack teeth 114 provided thereunder on the bottom wall 18.

Fixed to and spaced beneath the cover plate 28 are two combined separators and guides 116, which include short upright portions 118 depending from the cover plate 28 adjacent to the forward end thereof, and longitudinally elongated horizontal bars 120 which extend rearwardly from the portions 118. The bars 120 are at opposite sides of the middle sector gear 110. As shown in Figure 5, the bars 120 overlie the shaft 104, and are engaged with the upper sides of the sleeves 121 on the shaft 104, so as to hold the sector gears 118, 110 down and in mesh with the rack teeth 114.

Sliding horizontally through a central bore 122 in the mechanism casing rear end wall 22 on a level with the piston rods 98 is a single push rod 124 which has a rear end pivoted at 126 to an actuating lever 128, such as a brake pedal. The push rod 124 has a threaded forward end 130 which is threaded into the rear edge of a flat transversely elongated push bar 132, which has ends 134 which slidably bear against the side walls 20 to the rear of the sector gears. At and projecting forwardly from the ends and from the middle of the push bar 132 are lugs 136 and 137. The lug 137 is traversed by a pivot bolt 138 which secures the rear ends of links 140 to opposite sides of the lug 137. The forward ends of the links 140 and of links 141 similarly secured to the lug 136 are secured to opposite sides of the sector gears. The sector gears have radial extensions 142 which are provided with arcuate rows of adjustment holes 144 which are concentric to and are spaced farther from the shaft 104 than the sector teeth 112. Bolts 146 traverse the forward ends of the links 140 and 141 and extend through selected ones of the holes 144, according to the length of stroke of the push rod 124 desired. Spacer collars 148 on the shaft 104 serve to preserve the desired spacings between sector gears and piston rod bearings.

In operation, the brake pedal lever 128 being pushed down, the push rod 124 is pulled rearwardly and its movement is transmitted through the links 140 to the sector gears, whereby the sector gears are swung rearwardly, from a forward position to the rearward position shown in Figure 5. As the sector gears swing forwardly their teeth 112 move forwardly along the rack teeth 114 on the casing bottom wall 18, and in so doing drive the brake actuating pistons 86 forwardly in the bores 44 and force fluid under pressure into and through the brake lines 14 to the wheel cylinders 12 and apply the wheel brakes (not shown) individually related thereto.

All of the pistons 86 are driven forwardly at the same time and at the same rate and are similarly retracted by the springs 90. Because of the described operative connections of the pistons 86 together, even in the case of partial failure of one or more of the springs 90, the pistons will be retracted together and at the same rate. Should one of the cylinder kits 84 fail and the others remain intact, the brake cylinder related to the defective kit 84 will not be effectively operated, but the remaining brake cylinders will be fully and effectively operated, so that complete failure of the brake system at any time, such as occurs in the failure of a single cylinder master cylinder, is eliminated as a practical possibility.

It is to be noted that the mechanical advantage provided by sector gear and rack mechanism is such that much less than usual brake pedal pressure is required for quick and full application of the brakes of a system equipped with a device of the invention.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In a brake master cylinder assembly, a casing having a bottom wall, side walls, a closed end, and an open end, a brake cylinder mounted on the casing at and opening to said open end, a piston working in said cylinder, a piston rod engaged at one end with said piston and having another end extending into said casing toward said closed end, a rack on said casing bottom wall, a cam element having a sector on its lower end in mesh with said rack, a floating shaft extending across the interior of the casing and extending through said cam element on which the piston rod is journaled and which is journaled through said cam element at the center of said sector, said cam element having a portion extending above said shaft, said shaft being otherwise unconnected to the casing, a top wall on said casing having thereon a horizontal guide means engageable with means on said shaft, link means having a first end pivoted to said upper portion and a second end, a push bar extending across the interior of the casing to which the second end of the link means is pivoted, and a push rod slidably supported through the closed end of the casing and fixed to said push bar.

2. In a brake master cylinder assembly, a casing having a bottom wall, side walls, a closed end, and an open end, a brake cylinder mounted on the casing at and opening to said open end, a piston working in said cylinder, a piston rod engaged at one end with said piston and having another end extending into said casing toward said closed end, a rack on said casing bottom wall, a cam element having a sector on its lower end in mesh with said rack, a floating shaft extending across the interior of the casing and extending through said cam element on which the piston rod is journaled and which is journaled through said cam element at the center of said sector, said cam element having a portion extending above said shaft, said shaft being otherwise unconnected to the casing, a top wall on said casing having thereon a horizontal guide means engageable with a sleeve on said shaft, link means having a first end pivoted to said upper portion and a second end, a push bar extending across the interior of the casing to which the second end of the link means is pivoted, and a push rod slidably supported through the closed end of the casing and fixed to said push bar, said top wall being a removable cover plate for the casing.

3. In a brake master cylinder assembly, a casing having a bottom wall, side walls, a closed end, and an open end, a brake cylinder mounted on the casing at and opening to said open end, a piston working in said cylinder, a piston rod engaged at one end with said piston and having another end extending into said casing toward said closed end, a rack on said casing bottom wall, a cam element having a sector on its lower end in mesh with said rack, a floating shaft extending across the interior of the casing and extending through said cam element on which the piston rod is journaled and which is journaled through said cam element at the center of said sector, said cam element having a portion extending above said shaft, said shaft being otherwise unconnected to the casing, a top wall on said casing having thereon a horizontal guide means engageable with a sleeve on said shaft, link means having a first end pivoted to said upper portion and a second end, a push bar extending across the interior of the casing to which the second end of the link means is pivoted, and a push rod slidably supported through the closed end of the casing and fixed to said push bar, and means on the ends of said floating shaft slidably engaged with the casing sidewalls.

4. In a brake master cylinder assembly, a casing having a bottom wall, side walls, a closed end, and an open end, a brake cylinder mounted on the casing at and opening to said open end, a piston working in said cylinder, a piston rod engaged at one end with said piston and having another end extending into said casing toward said closed end, a rack on said casing bottom wall, a cam element having a sector on its lower end in mesh with said rack, a floating shaft extending across the interior of the casing and extending through said cam element on which the piston rod is journaled and which is journaled through said cam element at the center of said sector, said cam element having a portion extending above said shaft, said shaft being otherwise unconnected to the casing, a top wall on said casing having thereon a horizontal guide means engageable with a sleeve on said shaft, link means having a first end pivoted to said upper portion and a second end, a push bar extending across the interior of the casing to which the second end of the link means is pivoted, and a push rod slidably supported through the closed end of the casing and fixed to said push bar, said top wall being a removable cover plate for the casing, and means on the ends of the push bar slidably engaged with the casing side walls.

5. In a multiple cylinder brake master cylinder assembly, a casing having a bottom wall, side walls, a closed end and an open end, a plurality of brake cylinders in side-by-side relation at said open end, pistons working in said cylinders, piston rods on said pistons and extending into the interior of the casing, a floating shaft extending across the interior of the casing and slidably engaging said side walls at its ends, said shaft being journaled through the piston rods, a plurality of cam elements fixed on and spaced along the shaft, said cam elements having sectors on their lower ends concentric with the shaft and having upper portions extending above the shaft, a top wall on said casing having horizontal guide bars located between adjacent cam elements and engageable with means on the shaft, racks on the casing bottom wall with which said sectors are in mesh, a single push bar extending across the interior of the casing between the shaft and the closed end of the casing, said push bar bearing slidably against the casing sidewalls at its ends, link means extending between and pivoted at their ends to related cam element upper portions and the push bar, and push rod means slidably supported through the closed end of the casing and fixed to the push bar.

6. In a multiple cylinder brake master cyclinder assembly, a casing having a bottom wall, side walls, a closed end and an open end, a plurality of brake cylinders in side-by-side relation at said open end, pistons working in said cylinders, piston rods on said pistons and extending into the interior of the casing, a floating shaft extending across the interior of the casing and slidably engaging said side walls at its ends, said shaft being journaled through the piston rods, a plurality of cam elements fixed on and spaced along the shaft, said cam elements having sectors on their lower ends concentric with the shaft and having upper portions extending above the shaft, a top wall on said casing having horizontal guide bars located between adjacent cam elements and engageable with a sleeve on the shaft, racks on the casing bottom wall with which said sectors are in mesh, a single push bar extending across the interior of the casing between the shaft and the closed end of the casing, said push bar bearing slidably against the casing side walls at its ends, link means extending between and pivoted at their ends to related cam element upper portions and the push bar, and push rod means slidably supported through the closed end of the casing and fixed to the push bar, said floating shaft and said push bar being not otherwise supported in the casing.

References Cited in the file of this patent

UNITED STATES PATENTS

| | | |
|---|---|---|
| 1,888,092 | Peterson | Nov. 15, 1932 |
| 1,999,211 | Sauzedde | Apr. 30, 1935 |
| 2,008,975 | Boughton et al. | July 23, 1935 |
| 2,160,074 | La Brie | May 30, 1939 |
| 2,181,626 | Nicol | Nov. 28, 1939 |
| 2,189,904 | Insko | Feb. 13, 1940 |
| 2,284,669 | Masteller | June 2, 1942 |
| 2,459,394 | Sawtelle | Jan. 18, 1949 |
| 2,563,119 | Herriott | Aug. 7, 1951 |
| 2,596,119 | Blackman | May 13, 1952 |
| 2,608,104 | Feeney et al. | Aug. 26, 1952 |
| 2,609,067 | Blafield | Sept. 2, 1952 |
| 2,747,372 | York | May 29, 1956 |
| 2,811,862 | Libby | Nov. 5, 1957 |

FOREIGN PATENTS

| | | |
|---|---|---|
| 779,980 | France | Jan. 24, 1935 |
| 405,724 | Italy | Sept. 4, 1943 |